United States Patent
Nonaka

(10) Patent No.: US 9,287,970 B2
(45) Date of Patent: Mar. 15, 2016

(54) OPTICAL TRANSMISSION DEVICE AND OPTICAL TRANSMISSION METHOD

(71) Applicant: FUJITSU LIMITED, Kawasaki-shi, Kanagawa (JP)

(72) Inventor: Ayumu Nonaka, Ogoori (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 13/779,797

(22) Filed: Feb. 28, 2013

(65) Prior Publication Data

US 2013/0294762 A1 Nov. 7, 2013

(30) Foreign Application Priority Data

May 1, 2012 (JP) ................................. 2012-104824

(51) Int. Cl.
| | | |
|---|---|---|
| *G02F 2/00* | (2006.01) | |
| *H04B 10/00* | (2013.01) | |
| *H04J 14/00* | (2006.01) | |
| *H04B 10/08* | (2006.01) | |
| *H04B 17/00* | (2015.01) | |
| *H04B 10/038* | (2013.01) | |
| *H04B 10/032* | (2013.01) | |
| *H04B 10/275* | (2013.01) | |

(52) U.S. Cl.
CPC ............ *H04B 10/038* (2013.01); *H04B 10/032* (2013.01); *H04B 10/275* (2013.01)

(58) Field of Classification Search
CPC ... H04B 10/032; H04B 10/038; H04B 10/275
USPC .......................................... 398/2, 12, 19, 17
See application file for complete search history.

(56) References Cited

U.S. PATENT DOCUMENTS

| | | | | |
|---|---|---|---|---|
| 6,341,032 B1* | 1/2002 | Fukashiro | ............. | H01S 3/0014 359/337 |
| 7,466,478 B2* | 12/2008 | Maeda | ................ | H04J 14/0291 359/341.4 |
| 8,396,366 B2* | 3/2013 | Ferrari | ................. | H04B 10/032 398/27 |
| 8,676,054 B2* | 3/2014 | Suzuki | ................... | H04B 10/27 398/202 |
| 2001/0046074 A1* | 11/2001 | Kakizaki | ............. | H04B 10/032 398/5 |
| 2002/0172453 A1* | 11/2002 | Carberry | ............. | H04B 10/032 385/20 |

(Continued)

FOREIGN PATENT DOCUMENTS

| | | |
|---|---|---|
| JP | 2005-12689 | 1/2005 |
| JP | 2009-159097 | 7/2009 |

(Continued)

OTHER PUBLICATIONS

Japanese Office Action for related Japanese Patent Application No. 2012-104824, issued Dec. 8, 2015.

*Primary Examiner* — Ken Vanderpuye
*Assistant Examiner* — Abbas H Alagheband
(74) *Attorney, Agent, or Firm* — Staas & Halsey LLP

(57) ABSTRACT

An optical transmission device includes: a switching configured to be capable of switching a transmission path to which light is input from a first transmission path to a second transmission path; a first calculation unit configured to calculate, based on a difference between a first light level of the first transmission path and a second light level of the second transmission path, a first control amount for the second light level; and a control unit configured to perform a first control in which the second light level is decreased or increased based on the first control amount upon switching of the transmission path.

12 Claims, 10 Drawing Sheets

(56) References Cited

U.S. PATENT DOCUMENTS

| | | | |
|---|---|---|---|
| 2004/0208574 A1* | 10/2004 | Kinoshita | H04Q 11/0005 398/83 |
| 2004/0208578 A1* | 10/2004 | Kinoshita | H04J 14/021 398/83 |
| 2005/0123305 A1 | 6/2005 | Kawasumi | |
| 2005/0168806 A1* | 8/2005 | Maeda | H04J 14/0291 359/341.4 |
| 2005/0213972 A1* | 9/2005 | Aoki | H04B 10/032 398/49 |
| 2006/0188253 A1* | 8/2006 | Shimada | H04B 1/745 398/31 |
| 2007/0138417 A1* | 6/2007 | Sugiyama | H04B 10/032 250/551 |
| 2008/0075468 A1* | 3/2008 | Aiba | H04B 10/032 398/182 |
| 2008/0152342 A1* | 6/2008 | Hung | H04B 10/032 398/5 |
| 2009/0162022 A1 | 6/2009 | Koganei | |
| 2010/0209113 A1* | 8/2010 | Nagaki | H04B 10/40 398/140 |
| 2011/0019995 A1* | 1/2011 | Suzuki | H04B 10/27 398/29 |
| 2012/0170925 A1* | 7/2012 | Liu | H04B 10/032 398/5 |
| 2012/0248287 A1* | 10/2012 | Shukunami | H04B 10/032 250/205 |

FOREIGN PATENT DOCUMENTS

| | | |
|---|---|---|
| WO | 2004/045114 | 5/2004 |
| WO | WO 2006/035481 A1 | 4/2006 |

* cited by examiner

OPTICAL TRANSMISSION DEVICE AND OPTICAL TRANSMISSION METHOD

CROSS-REFERENCE TO RELATED APPLICATION(S)

This application is based upon and claims the benefit of priority of the prior Japanese Patent Application No. 2012-104824, filed on May 1, 2012, the entire contents of which are incorporated herein by reference.

FIELD

The embodiments discussed herein are related to an optical transmission device and an optical transmission method.

BACKGROUND

In an optical transmission network, a double transmission path that couples optical transmission devices is provided. In an optical protection scheme, when a failure has occurred in one of transmissions path (work system), the transmission path is switched to the other transmission path (protection system), so that optical transmission continues. In an optical unidirectional path-switched ring (OUPSR) scheme that is an optical protection scheme, a transmission-side transponder device transmits the same optical signal to both of the work system and the protection system, and a reception-side transponder device switches between the work system and the protection system using an optical switch or the like. The reception-side transponder device transfers the optical signal to a subsequent client device. The light receiving properties of the transponder devices differ in accordance with the level of the optical signal received from the optical transmission network, for example, the light level. Variation in the level of input light markedly affects the receiving properties of the transponder devices at an optical transmission speed of about 10 Gbps.

Related art is disclosed in International Publication Pamphlet No. WO 2006/035481 and Japanese Laid-open Patent Publication No. 2005-12689.

SUMMARY

According to one aspect of the embodiments, an optical transmission device includes: a switching configured to be capable of switching a transmission path to which light is input from a first transmission path to a second transmission path; a first calculation unit configured to calculate, based on a difference between a first light level of the first transmission path and a second light level of the second transmission path, a first control amount for the second light level; and a control unit configured to perform a first control in which the second light level is decreased or increased based on the first control amount upon switching of the transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

There is a difference between the permissible range of a level of light input to a transponder device and the permissible range of a level of light input to a network-side optical module included in the transponder device. For example, the permissible range of a light level of the network-side optical module included in the transponder device is narrower than the permissible range of a light level of the transponder device. For this reason, in a reception-side transponder device, a variable optical attenuator (VOA) performs an adjustment so that the level of light input to the network-side optical module included in the transponder device falls within the permissible range. The transponder device monitors a level of light output from the VOA so that the level of light input to the network-side optical module included in the transponder device is stable regardless of the level of light input to the VOA, and performs feedback control for reflecting a monitoring result on the level of light input to the VOA. The feedback control may be performed regardless of whether or not switching of a transmission path by an optical switch has been performed.

In an optical transmission network in which feedback control is performed, there may be a significant change with time in the level of light input from the transmission path to the transponder device. A light level immediately after switching has been performed in accordance with a difference in a light level between a work system and a protection system or a switching timing may fail to fall within the permissible range of the network-side optical module included in the transponder device even after the feedback control. For example, when a light level of a system that is a switching destination is large, feedback control performed by the VOA does not keep up with the light level, so that an optical signal with a level exceeding the permissible range may temporarily be input to the network-side optical module included in the transponder device. When a light level of a system that is a switching destination is small, similarly, an optical signal with a level below the permissible range may temporarily be input to the network-side optical module included in the transponder device.

When a level of light output from the VOA fails to fall within the permissible range, a waveform of light in the network-side optical module included in the transponder device is deteriorated, so that a bit error may occur. For example, when switching is performed to a system in which a light level is large, an internal component in an optical module of a client device may be deteriorated. When switching is performed to a system in which a light level is small, a level of light input to the client device does not attain a certain value, so that a loss of signal (LOS) may occur.

Figure 1:
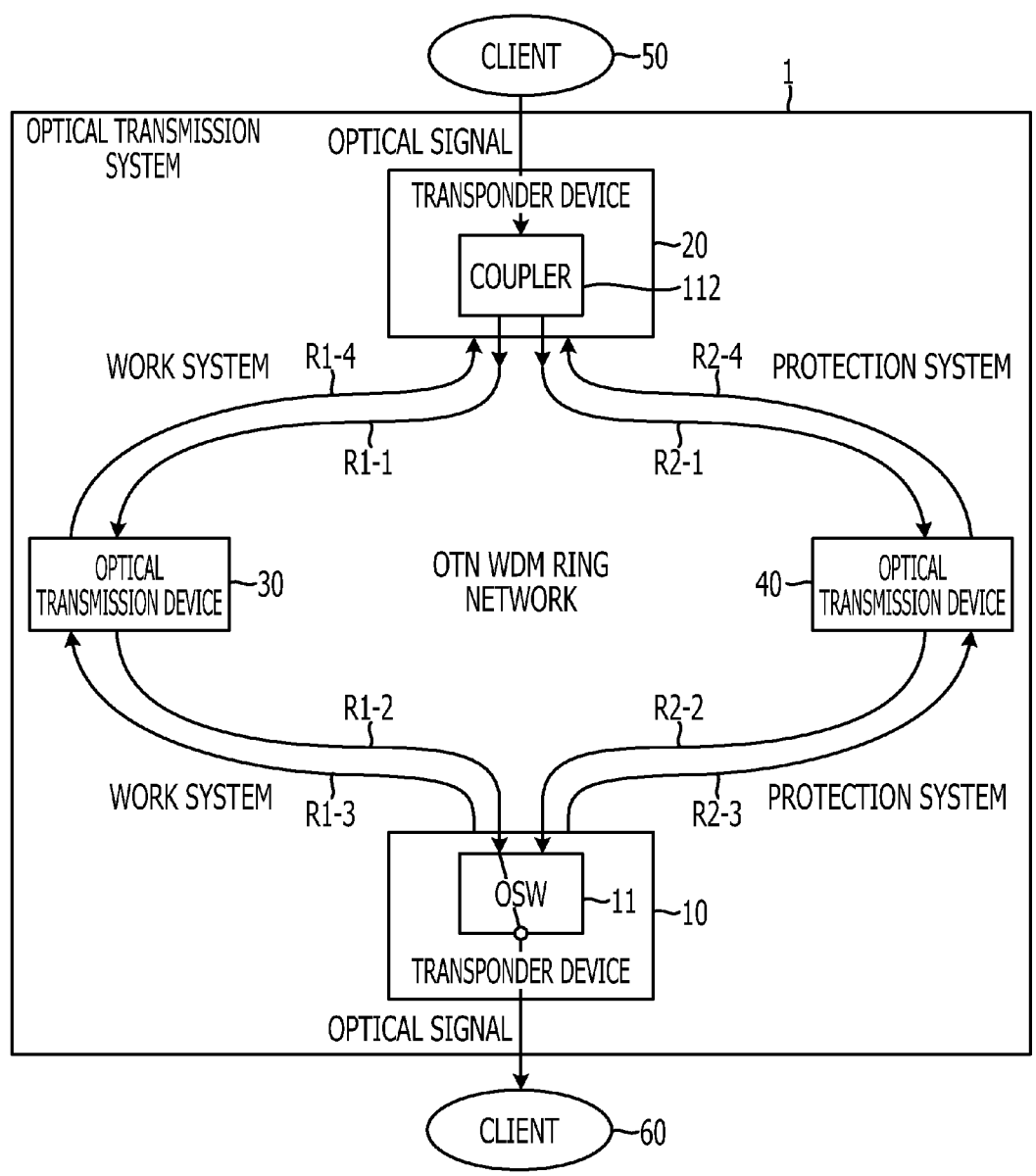
FIG. 1 illustrates an exemplary optical transmission system.

FIG. 1 illustrates an exemplary optical transmission system 1. The optical transmission system 1 illustrated in FIG. 1 includes transponder devices 10 and 20, and optical transmission devices 30 and 40. In the optical transmission system 1, a ring network using an optical transport network-wavelength division multiplexing (OTN-WDM) scheme may be employed. In the optical transmission system 1, transmission paths R1-1 to R1-4 for a work system and transmission paths R2-1 to R2-4 for a protection system is provided between the transponder devices 10 and 20 and a double transmission path is provided. Thus, when a failure has occurred in the work system transmission paths R1-1 to R1-4, optical communication between clients 50 and 60 may be maintained by the protection system transmission paths R2-1 to R2-4.

For example, the transponder device 10 serving as a receiving station performs conversion of data from the client into a network-side digital wrapper signal or performs reverse conversion. When the transponder device 10 detects a line failure in the work system in an optical layer and an OTN layer, the transponder device 10 switches the transmission path from the work system to the protection system by using an optical switch (OSW) 11. A function for switching between transmission paths may be referred to as an optical protection function. A scheme may be referred to as an OUPSR in which, as in the optical transmission system 1, the transmission-side transponder device 20 transmits the same signal to the optical transmission device 30 for the work system and the optical transmission device 40 for the protection system, and in which the reception-side transponder device 10 switches between the work system and the protection system.

Figure 2:
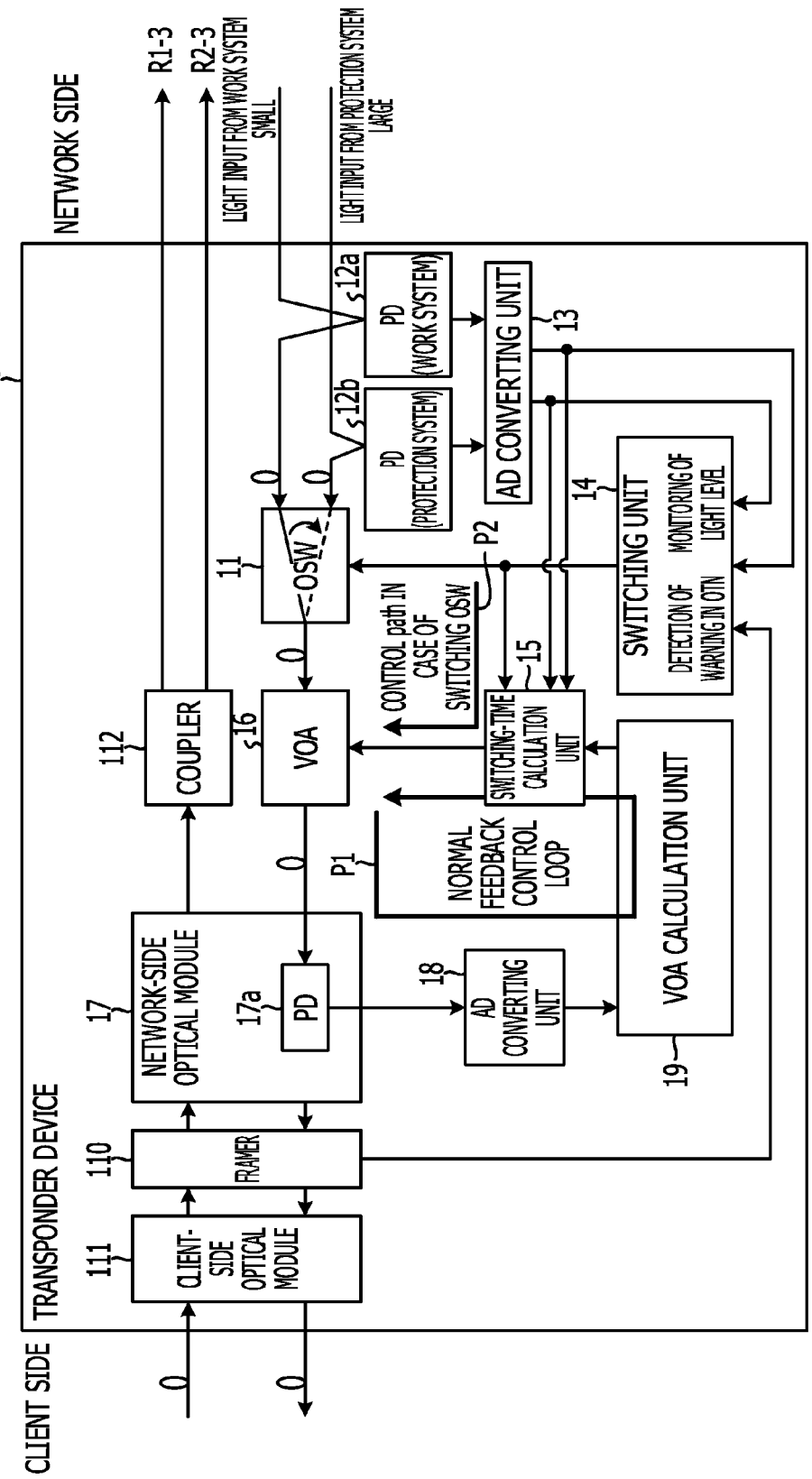
FIG. 2 illustrates an exemplary transponder device.

FIG. 2 illustrates an exemplary transponder device. As illustrated in FIG. 2, the transponder device 10 includes the OSW 11, photodiodes (PDs) 12a and 12b, an analog to digital (AD) converting unit 13, a switching unit 14, a switching-time calculation unit 15, and a VOA 16. The transponder device 10 further includes a network-side optical module 17, an AD converting unit 18, a VOA calculation unit 19, a framer 110, a client-side optical module 111, and a coupler 112. These components may be coupled in such a manner that an optical signal or data is unidirectionally or bidirectionally able to be input/output.

The OSW 11 switches the transmission path via which an optical signal is input to either the work system or the protection system. The PDs 12a and 12b respectively convert optical signals that have reached thereto via the work system and protection system transmission paths into voltages and therefore may correspond to light level monitors for detecting a light level. The AD converting unit 13 converts the light levels detected by the individual PDs 12a and 12b from analog values to digital values. The switching unit 14 receives monitoring results of the light levels from the AD converting unit 13 and receives a warning about a loss of frame synchronization or the like from the framer 110. The switching unit 14 instructs the OSW 11 to switch between the systems in accordance with the input data and notifies the switching-time calculation unit 15 of completion of the switching instruction. In accordance with notification of the completion of the switching instruction from the switching unit 14, the switching-time calculation unit 15 interrupts VOA control using a normal feedback control loop P1 and starts VOA control using a control path P2 in the case where switching of the OSW 11 is performed.

The VOA 16 may recognize the correspondence relationship between a drive voltage value and an attenuation amount in advance. The VOA 16 decides upon an attenuation amount of a light level in accordance with a drive pulse input from the switching-time calculation unit 15 and outputs an attenuated optical signal to the network-side optical module 17. For example, there is a difference between a light level input to the transponder device 10 and a permissible light level of the network-side optical module 17 and the client-side optical module 111 which are included in the transponder device 10, and the VOA 16 therefore performs the adjustment so that a light level input to the network-side optical module 17 and the client-side optical module 111 falls within permissible values. The difference may be defined as a relationship a permissible value of the light level input to the optical module<a value of the light level input to the device. The network-side optical module 17 converts the optical signal input from the VOA 16 into an electric signal and outputs the converted signal to the framer 110.

The AD converting unit 18 converts a light level detected by a PD 17a in the network-side optical module 17 from an analog value to a digital value. The VOA calculation unit 19 forms the normal feedback control loop P1 and controls the VOA 16 so that a light level of a signal input to the network-side optical module 17 is stable regardless of a light level of a signal input to the VOA 16. When the detected light level is a threshold value or less, the framer 110 detects a line failure in the OTN layer, for example, a warning about a loss of frame synchronization. The client-side optical module 111 converts the optical signal input from the framer 110 into an electric signal and outputs the converted signal to the client 60. The coupler 112 branches the optical signal input from the network-side optical module 17 into optical signals and sends the resulting optical signals to the transmission paths R1-3 and R2-3.

Figure 3:
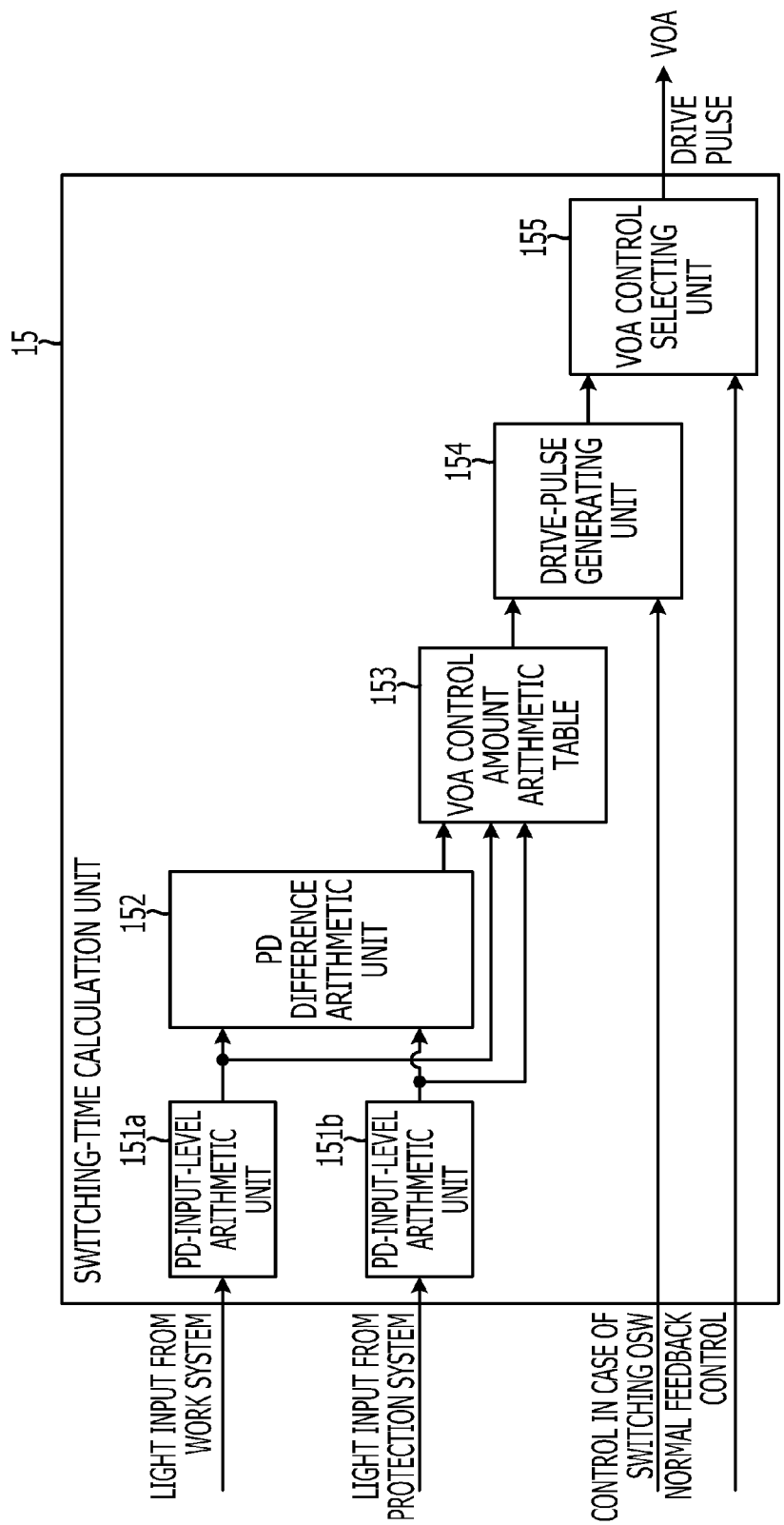
FIG. 3 illustrates an exemplary switching-time calculation unit.

FIG. 3 illustrates an exemplary switching-time calculation unit. The switching-time calculation unit illustrated in FIG. 3 may be the switching-time calculation unit 15 in the transponder device 10 illustrated in FIG. 2. As illustrated in FIG. 3, the switching-time calculation unit 15 includes PD-input-level arithmetic units 151a and 151b, a PD difference arithmetic unit 152, a VOA control amount arithmetic table 153, a drive-pulse generating unit 154, and a VOA control selecting unit 155. The PD-input-level arithmetic unit 151a calculates a light input level of the work system. The PD-input-level arithmetic unit 151b calculates a light input level of the protection system. The PD difference arithmetic unit 152 calculates a difference in a light level between the work system and the protection system based on the calculated results input from the PD-input-level arithmetic units 151a and 151b.

The VOA control amount arithmetic table 153 stores, in the case where switching of the OSW 11 is performed, an attenuation amount for the VOA 16 calculated in accordance with light levels of the work system and the protection system and a light level difference therebetween. A VOA control amount may include an attenuation amount corresponding to a control amount for decreasing an excessively high light level and an opening amount corresponding to a control amount for increasing an excessively low light level. The drive-pulse generating unit 154 refers to the VOA control amount arithmetic table 153 and generates a drive pulse for electrically driving the VOA 16. The VOA control selecting unit 155 selects, in accordance with whether or not switching has been performed, either the normal feedback control loop P1 or the control path P2 in the case where switching of the OSW 11 is performed, for control of the VOA 16.

Figure 4:
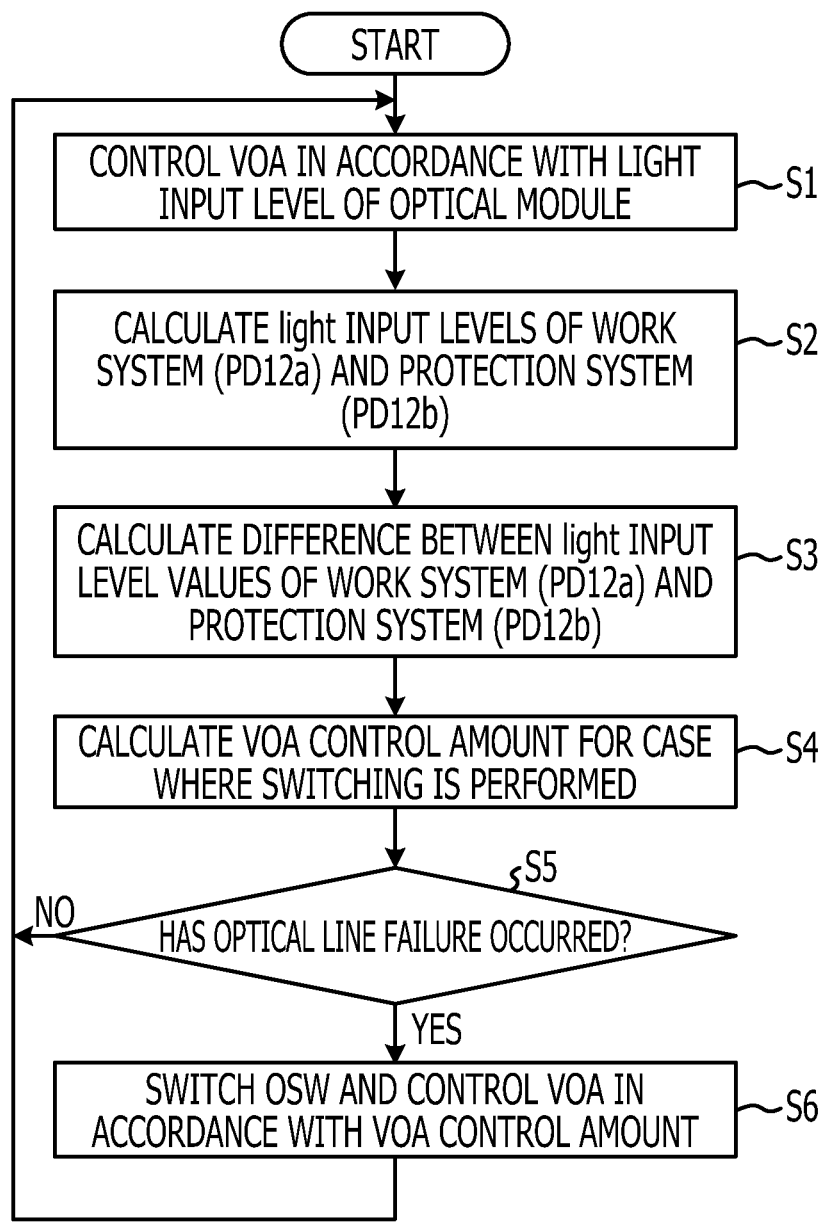
FIG. 4 illustrates an exemplary operation performed by a transponder device.

FIG. 4 illustrates an exemplary operation of a transponder device. The transponder device 10 illustrated in FIG. 2 may perform the operation illustrated in FIG. 4. The VOA calculation unit 19 controls the VOA 16 in accordance with a light level of an optical signal input to the network-side optical module 17 (S1). In S2, the switching-time calculation unit 15 calculates a light input level for each of the work system and the protection system based on a digital value input from the AD converting unit 13. In S3, the switching-time calculation unit 15 calculates a difference value between the two light input levels calculated in S2. The difference value between the light input levels may be calculated by the switching-time calculation unit 15 regardless of the operating state of the work system or the protection system. Calculation may be performed at all times.

In S4, the switching-time calculation unit 15 calculates, based on the light input levels calculated in S2 and the difference value between the light input levels calculated in S3, a VOA control amount for the case where switching is performed. For example, when the transmission path is switched from the work system to the protection system, the switching-time calculation unit 15 may calculate an appropriate VOA control amount so that light with a higher level or a lower level than a previous level is not input to the network-side optical module 17 or the client-side optical module 111. Calculation of the VOA control amount may be performed at all times so as to follow changes in light levels and reduce a time lag regardless of whether or not notification of switching has been performed. Calculation of the VOA control amount may be performed upon switching from the work system to the protection system or from the protection system to the work system.

In S5, the switching unit 14 monitors occurrence of an optical line failure for the work system. When occurrence of a failure is detected (Yes in S5), the switching unit 14 switches the OSW 11 from the work system to the protection system and controls the VOA 16 based on the VOA control amount calculated in S4 (S6). Monitoring may be performed at all times. After the control has been performed, feedback control based on a light level input to the network-side optical module 17 is restarted. In comparison to the case where normal feedback control is performed after switching of the OSW 11, a light level may reach an appropriate value earlier. The transponder device 10 may return to normal optical transmission promptly even after switching of the transmission path. While occurrence of a failure is not detected (No in S5), the switching unit 14 may not perform switching of the OSW 11 and control of the VOA 16. The processing from S1 is performed again.

Figure 5:
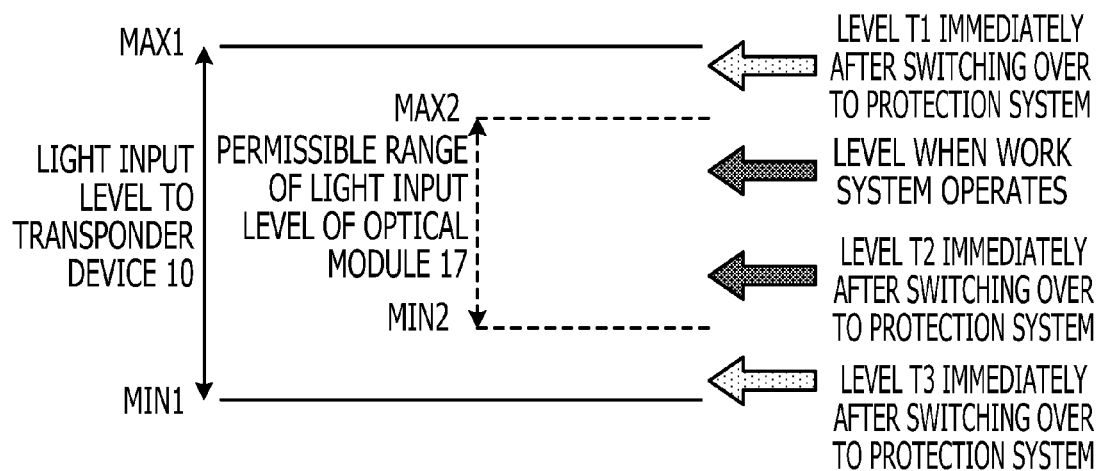
FIG. 5 illustrates an exemplary light level.

FIG. 5 illustrates an exemplary light level. In FIG. 5, the relationship between a light level input to the transponder device 10 and a permissible light level of the network-side optical module 17 is illustrated. For example, a light level input to the transponder device 10 may be a value between MIN1 to MAX1. For example, a permissible value set by standards as a light level permitted to be input to the network-side optical module 17 may be a value between MIN2 to MAX2. In order to configure a WDM network, the relationship between a light level input to the transponder device 10 and a light input level when the network-side optical module 17 is used may satisfy a relationship MIN1 to MAX1>MIN2 to MAX2.

After switching over to the protection system, a light level within the range of MIN2 to MAX2 when the work system operates may be classified into the following three cases T1 to T3. A case 1 may be a level T1 immediately after switching to the protection system. In the case 1, a light level is temporarily within the range of MAX2 to MAX1, and therefore may exceed the permissible value of the light level of the network-side optical module 17. The light level falls within the permissible range, for example, the range of MIN2 to MAX2 of the network-side optical module 17 in accordance with the subsequent VOA control. A bit error due to optical waveform degradation in a module input unit or component degradation inside the network-side optical module 17 may occur before the light level falls within the permissible range.

A case 2 may be a level T2 immediately after switching to the protection system. In the case 2, after switching as well, a light level falls within the range of MIN2 to MAX2 and is maintained within the permissible range of the input level of the network-side optical module 17 without waiting for performance of the VOA control. A case 3 may be a level T3 immediately after switching to the protection system. In the case 3, a light level is within the range of MIN1 to MIN2, and therefore may be below the permissible value of the light level of the network-side optical module 17. The light level falls within the permissible range, for example, the range of MIN2 to MAX2 of the network-side optical module 17 in accordance with the subsequent VOA control. A bit error due to optical waveform degradation in the module input unit may occur before the light level falls within the permissible range. For example, in a general purpose VOA, it takes about 10 ms to attenuate a light level of 3 dB. Thus, the larger the target light level to be subjected to attenuation control is, the longer the period of time over which the light level is beyond the permissible range of the input level of the network-side optical module 17 may be. For this reason, a bit error or component degradation may occur. The period of time over which the light level is beyond the permissible range may approach a period of time starting from the occurrence of a failure in a transmission path to recovery therefrom (permissible limit time), for example, 50 ms.

Figure 6A:
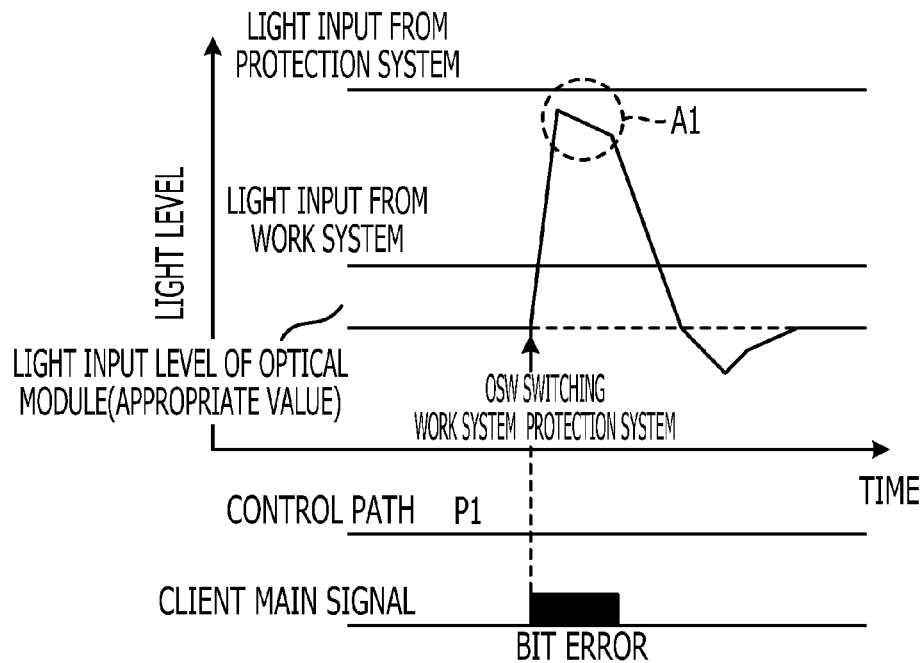
FIGS. 6A and 6B each illustrate an exemplary change in a light level with time.
Figure 6B:
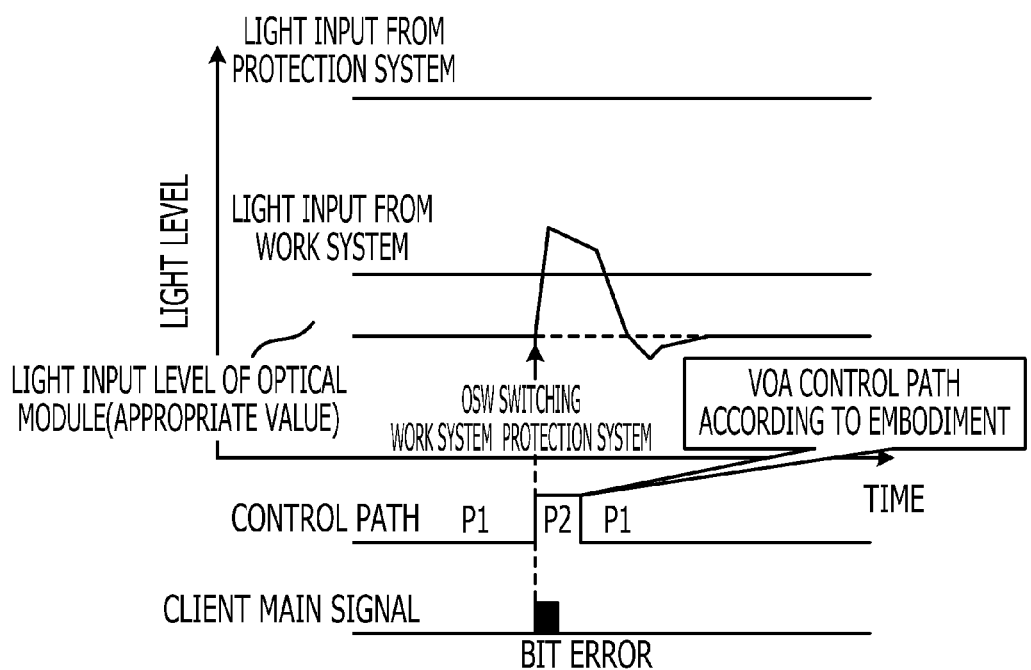

In the case of switching the OSW 11, when a light level of a switching destination is high, the switching-time calculation unit 15 supplies the VOA 16 with a drive pulse based on the attenuation amount stored in the VOA control amount arithmetic table 153. The switching-time calculation unit 15 controls a light attenuation amount so that light with a high level is not input to the network-side optical module 17. FIGS. 6A and 6B each illustrate an exemplary change in light level with time. FIG. 6A illustrates the change in light level with time when the light level of a switching destination is high. In FIG. 6A, the x axis represents a time and the y axis represents a light level. As illustrated in FIG. 6A, a light level input to an optical module is maintained at an appropriate value in an initial state. Because a light level of the protection system is higher than a light level of the work system, a level of light input to the network-side optical module 17 increases sharply in accordance with switching to the protection system as illustrated by a dashed line A1. The light level gradually becomes stable by normal feedback control, for example, a control path P1 illustrated in FIG. 2, and reaches the appropriate value after a certain period of time, for example, 50 ms has elapsed. A bit error for a relatively long period of time, for example, 20 ms may occur on a signal that is to be transmitted to the client 60 before the light level reaches the appropriate value. The bit error may increase a time period taken to complete switching using the OUPSR. Such a high light level that exceeds the standards of the network-side optical module 17, for example, an appropriate range, may damage the network-side optical module 17.

FIG. 6B illustrates the change in light level with time when the light level of a switching destination is high. For example, control of the light level for the VOA 16 may include the feedback control and the different control path P2 (see FIG. 2) upon switching to the protection system. The VOA 16 is forcibly controlled in a closing direction in accordance with the light level of the work system, the light level of the protection system, and a difference between the light levels, so that the increase in the light level after switching may be reduced. For this reason, a time period over which a bit error occurs, for example, 5 ms, may be reduced and switching using the OUPSR may be completed in a short time period. A time period over which control using the control path P2 is performed may be set and changed so that the increase in light level is reduced and a time period taken for a light level to reach an appropriate value is reduced, and may be set to be, for example, about 5 to 10 ms.

Figure 7A:
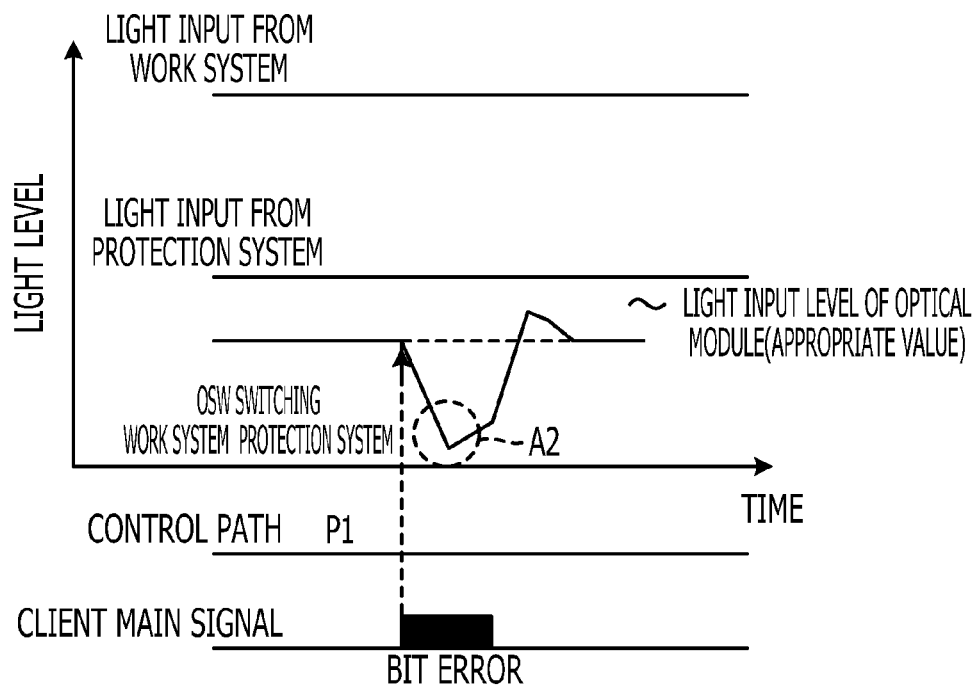
FIGS. 7A and 7B each illustrate an exemplary change in a light level with time.
Figure 7B:
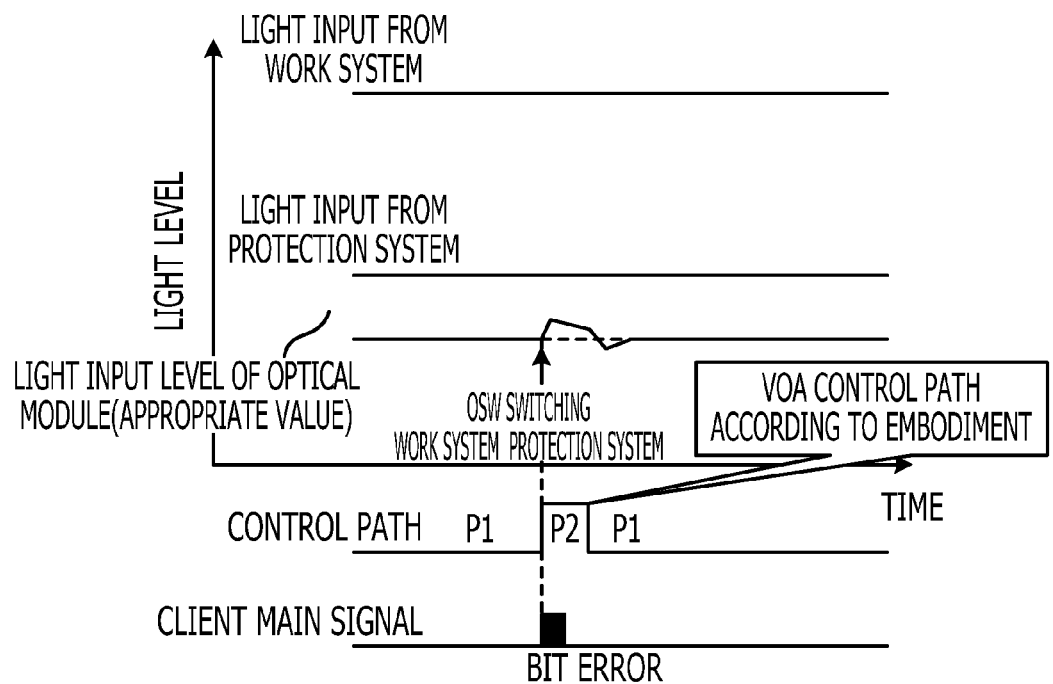

When a light level of a switching destination is low, control in an opposite direction to the foregoing control may be performed. For example, the switching-time calculation unit 15 supplies the VOA 16 with a drive pulse based on the attenuation amount stored in the VOA control amount arithmetic table 153 in the case of switching the OSW 11. The switching-time calculation unit 15 therefore controls a light attenuation amount so that light with a low level is not input to the network-side optical module 17. FIGS. 7A and 7B each illustrate an exemplary change in light level with time. FIG. 7A illustrates the change in light level with time when the light level of a switching destination is low. In FIG. 7A, the x axis represents a time and the y axis represents a light level. As illustrated in FIG. 7A, a light level input to an optical module is maintained at an appropriate value in an initial state. Because a light level of the protection system is lower than a light level of the work system, a level of light input to the network-side optical module 17 decreases in accordance with switching to the protection system as illustrated by a dashed line A2 and the light level may become insufficient. The light level gradually may recover by normal feedback control, for example, the control path P1 illustrated in FIG. 2, and reach the appropriate value after a certain period of time, for example, 30 ms has elapsed. A bit error for a relatively long period of time, for example, 20 ms may occur on a signal that is to be transmitted to the client 60 before the light level reaches the appropriate value. The bit error may increase a time period taken to complete switching using the OUPSR.

FIG. 7B illustrates the change in light level with time when the light level of a switching destination is low. Control of the light level for the VOA 16 may include the feedback control and the different control path P2 (see FIG. 2) upon switching to the protection system. Hence, the VOA 16 is forcibly controlled in an opening direction in accordance with the light level of the work system, the light level of the protection system, and a difference between the light levels, so that the decrease in the light level after switching may be reduced. A time period over which a bit error occurs, for example, 5 ms may be reduced and switching using the OUPSR may be completed in a short time period. A time period over which control using the control path P2 is performed may be set and changed so that the decrease in light level is reduced and a time period taken for a light level to reach an appropriate value is shortened, and may be set to be, for example, about 5 to 10 ms.

Figure 8:
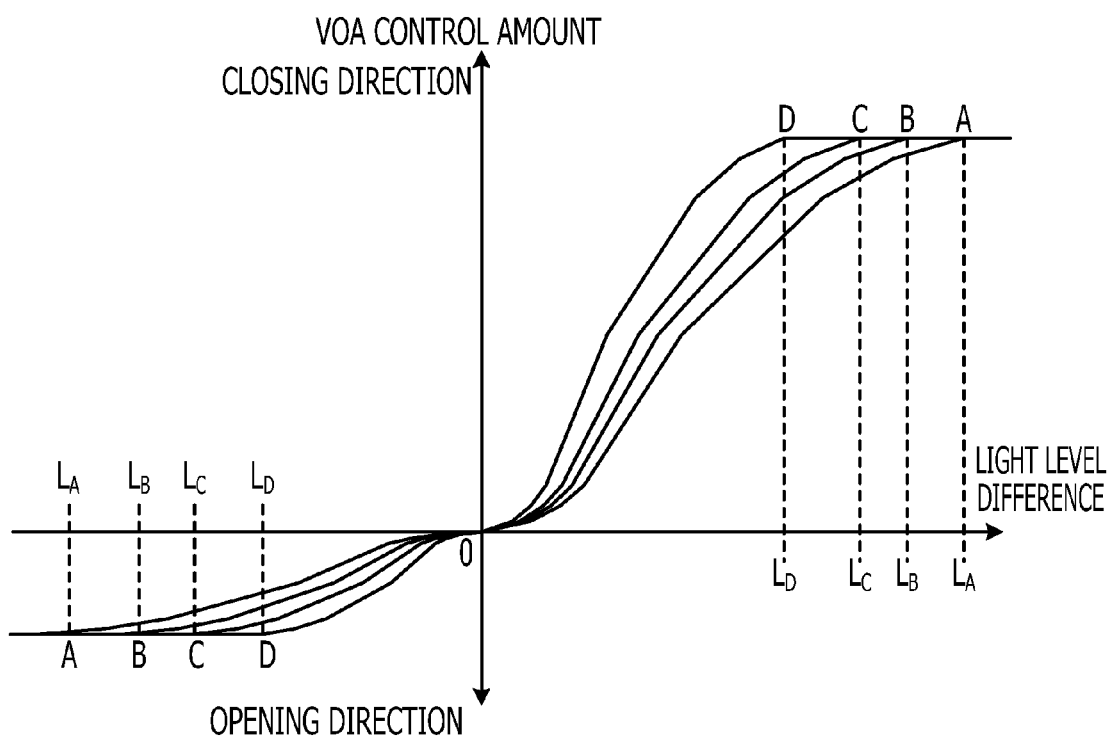
FIG. 8 illustrates an exemplary relationship between a light level difference and a VOA control amount.

FIG. 8 illustrates an exemplary relationship between a light level difference and a VOA control amount. FIG. 8 may illustrate the relationship between the light level difference and the VOA control amount when switching is performed from the work system to the protection system. In FIG. 8, the x axis represents a light level difference and the y axis represents a VOA control amount. The light level difference of the x axis may be a value obtained by subtracting a light level of the work system from a light level of the protection system. A to D illustrated in FIG. 8 each indicate a light level value of the work system. In FIG. 8, switching may be performed from the work system to the protection system and a positive direction of the x axis may indicate a direction in which the light level of a switching destination increases. A negative direction of the x axis may indicate a direction in which the light level of the switching destination decreases. As for a VOA control amount, a positive direction may be a closing direction. Thus, the more the VOA control amount increases, the more the attenuation amount increases, and the more the VOA control amount decreases, the more an opening amount increases. A first quadrant (x and y are positive) illustrated in FIG. 8 indicates an arithmetic range when a light level of the switching destination is higher than that of a switching source. A third quadrant (x and y are negative) illustrated in FIG. 8 indicates an arithmetic range when the light level of the switching destination is lower than that of the switching source.

As illustrated in FIG. 8, the VOA control amount increases as the light level difference increases; however, an increase per unit level difference may differ in accordance with a light level of the switching source (work system) or a light level difference. For example, an increase per unit level difference (a ratio indicating an increase) may be set so that the higher the light level of the work system side serving as the switching source is, the larger the increase is, and the lower the light level is, the smaller the increase is, for example, set to satisfy a relationship A<B<C<D. As illustrated in FIG. 8, the increase per unit level difference (a ratio indicating an increase) gradually decreases as the light level difference increases, and when the light level difference attains certain values ($L_A$, $L_B$, $L_C$, $L_D$), the ratio indicating an increase becomes 0, so that the VOA control amount converges a constant value.

When a light level of the switching destination is low, substantially similar settings may be made. For example, the VOA control amount decreases as the light level difference decreases; however, a decrease per unit level difference may differ in accordance with a light level of the switching source (work system) or a light level difference. For example, a decrease per unit level difference (a ratio indicating a decrease) may be set so that the lower the light level of the work system side serving as the switching source is, the smaller the decrease is, and the higher the light level is, the larger the decrease is, for example, set to satisfy a relationship A<B<C<D. As illustrated in FIG. 8, the decrease per unit level difference (a ratio indicating a decrease) gradually decreases as the light level difference decreases, and when the light level difference attains certain values ($L_A$, $L_B$, $L_C$, $L_D$), the VOA control amount converges a constant value.

Figure 9:
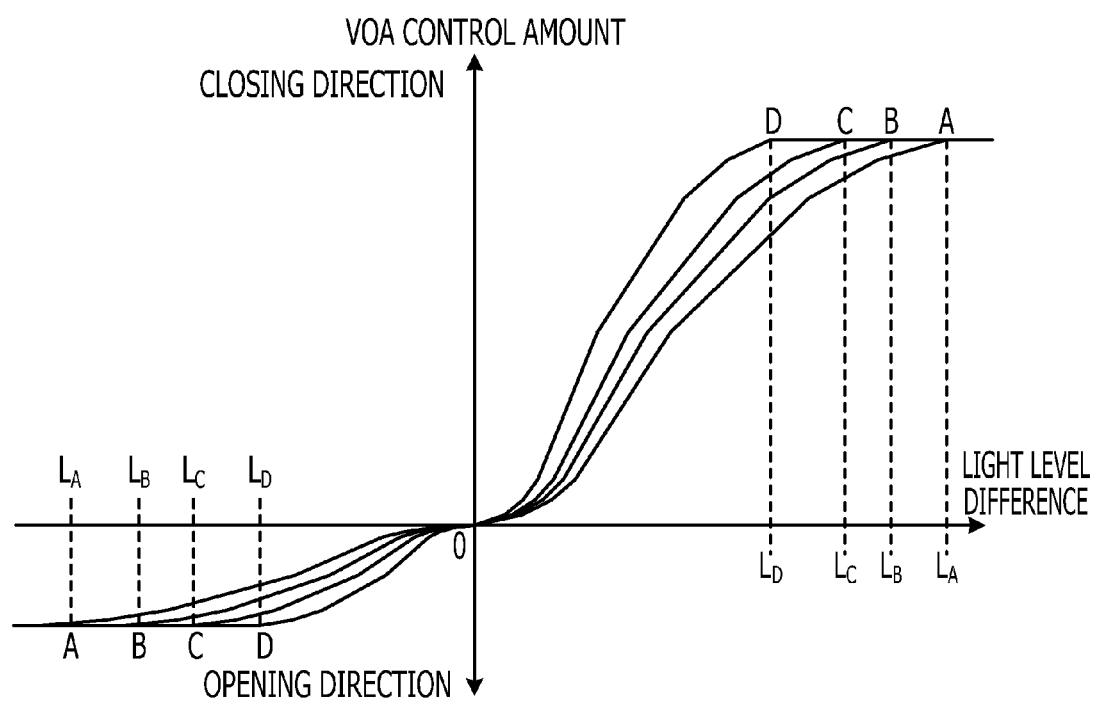
FIG. 9 illustrates an exemplary relationship between a light level difference and a VOA control amount.

When switching is performed from the work system to the protection system, a table may be referred to. When switching is performed from the protection system to the work system, another setting content in the VOA control amount arithmetic table 153 may be referred to. FIG. 9 illustrates an exemplary relationship between a light level difference and a VOA control amount. FIG. 9 may illustrate the relationship between the light level difference and the VOA control amount, for example, when switching is performed from the protection system to the work system. The light level difference illustrated in FIG. 9 may be a value obtained by subtracting a light level of the protection system from a light level of the work system. A to D illustrated in FIG. 9 each indicate a light level value of the protection system. In FIG. 9, the other elements may be substantially the same as or similar to the elements illustrated in FIG. 8. The drive-pulse generating unit 154 in the switching-time calculation unit 15 refers to the VOA control amount arithmetic table 153 and specifies a VOA control amount based on a light level value of a switching source and a light level difference between before and after switching. The drive-pulse generating unit 154 generates a drive pulse using the specified VOA control amount and outputs the drive pulse to the VOA control selecting unit 155. The switching-time calculation unit 15 changes the VOA control amount in accordance with levels of optical signals that are input and a difference therebetween and thereby adjusts a level of an optical signal to be output from the VOA 16 to an appropriate value.

Figure 10:
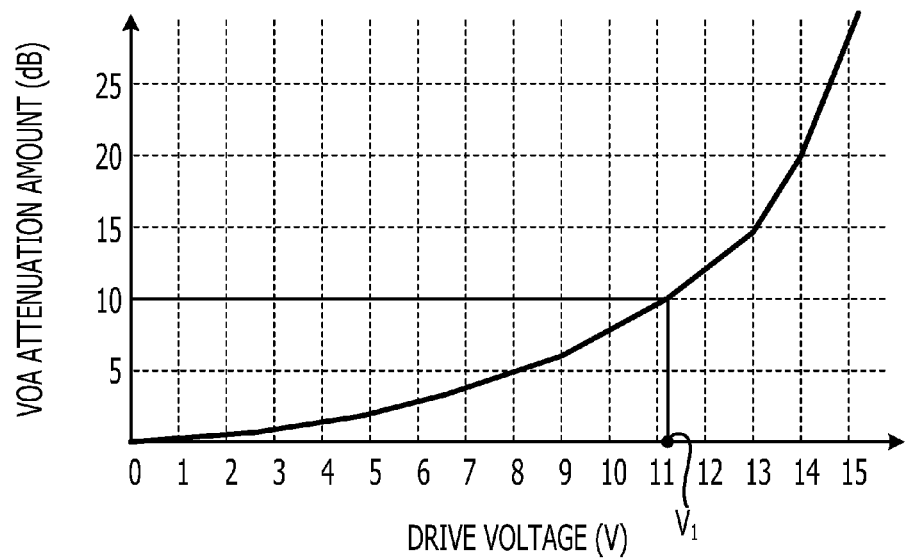
FIG. 10 illustrates an exemplary relationship between a drive voltage and a VOA control amount.

The VOA 16 decides upon a control amount of a light level in accordance with the drive pulse input from the switching-time calculation unit 15. FIG. 10 illustrates an exemplary relationship between a drive voltage and a VOA control amount. FIG. 10 may illustrate the relationship between the voltage (drive voltage) represented by a drive pulse of the VOA 16 when the light level is attenuated and a VOA attenuation amount. The x axis represents the drive voltage (in units of V) of the VOA 16 and the y axis represents the VOA attenuation amount (in units of dB). The VOA attenuation amount illustrated in FIG. 10 exhibits nonlinear characteristics having a positive correlation with the drive voltage. The switching-time calculation unit 15 attenuates the light level of the VOA 16 by applying a drive voltage to the VOA 16 using the drive pulse. For example, the switching-time calculation unit 15 may apply a drive voltage $V_1$ of, for example, 11.2 V to the VOA 16 so as to attenuate the light level by 10 dB. The drive-pulse generating unit 154 smoothes the drive pulse with, for example, pulse width modulation (PWM) duty=82.9% at 14 V in accordance with the VOA control amount (attenuation amount) set in the VOA control amount arithmetic table 153 to thereby generate a drive voltage of 11.2 V.

The transponder device 10 may switch a transmission path to which light is input, from the work system transmission path R1-2 to the protection system transmission path R2-2. The transponder device 10 may include the switching-time calculation unit 15, the OSW 11, and the VOA 16. The switching-time calculation unit 15 calculates, in accordance with a difference between a first light level of the work system transmission path R1-2 and a second light level of the protection system transmission path R2-2, a control amount for the second light level. Calculation may be performed at all times. The OSW 11 switches the transmission path for an optical signal from the work system transmission path R1-2 to the protection system transmission path R2-2. The VOA 16 may decrease or increase the second light level in accordance with the control amount calculated by the switching-time calculation unit 15 upon switching of the transmission path. Control of decrease or increase may be temporary control in a closing direction or an opening direction.

In an optical transmission device, for example, the transponder device 10, the switching-time calculation unit 15 may include, for example, a circuit, an independent device like a field programmable gate array (FPGA), a processor, or software controlled by a processor. A switching unit may include, for example, a circuit, an independent device, a processor, or software controlled by a processor. A control unit may include, for example, a circuit, an independent device like an FPGA, a central processing unit (CPU), a processor such as a digital signal processor (DSP), or software controlled by a processor. A VOA calculation unit may include, for example, a circuit, an independent device like an FPGA, a processor, or software controlled by a processor.

For example, when light with a high level is input to an optical module after switching of an optical switch, a transponder device performs feedback control on a variable optical attenuator (VOA). For this reason, a light input level may fall within the permissible range of the optical module. In order to attenuate a light level of 3 dB to an appropriate value, it may take, for example, about 10 ms. When this time exceeds the permissible limit of the optical module, a bit error or component degradation due to switching of a transmission path may occur. For example, the transponder device 10 may perform control of the VOA 16 in accordance with light levels before and after switching, substantially simultaneously with switching of a transmission path. Thus, after switching, a light level may not exceed the permissible value of the optical module. Occurrence of a bit error or component degradation may be reduced. A time period taken to switch the transmission path using the OUPSR scheme may be reduced.

The transponder device 10 performs calculation of a difference between light levels, a VOA control amount, etc. and monitoring control while operating. Calculation and monitoring control may be performed at all times. Parameter setting before operation of the device may not be performed. Variation in a light level during an operation may be flexibly and easily dealt with. For example, a device life of the transponder device 10 guaranteed for twenty years may be increased and a non-operating time due to maintenance in the case where the device is damaged may be reduced. Maintenance operability and reliability in an optical transmission network may be improved.

The switching-time calculation unit 15 in the transponder device 10 may calculate a control amount for the second light level in accordance with a difference between the first light level and the second light level, the first light level, and the second light level. Calculation may be performed at all times. For example, the transponder device 10 may refer to a light level difference between transmission paths, a light level of a switching source, and a light level of a switching destination when calculating a VOA control amount. An adjustment of a light level based on a difference in a light level between before and after switching may be performed. For this reason, variation in a light level due to switching may be reduced. The level of light input to the network-side optical module 17 may converge to an appropriate value in a short time period. A bit error period may be reduced.

The transponder device 10 may include the VOA calculation unit 19 that calculates a control amount for the second light level in accordance with the level of light output from the VOA 16 after a certain period of time, for example, 5 to 10 ms has elapsed from switching of a transmission path. The VOA 16 may adjust the second light level using the control amount calculated by the VOA calculation unit 19. For example, after a certain period of time has elapsed from switching of a transmission path, the transponder device 10 may return control of the VOA 16 from the control in the case where switching is performed to the previous feedback control. Excessive attenuation or an excessive increase in the light level is reduced and the light level may converge an appropriate value promptly.

The switching-time calculation unit 15 in the transponder device 10 may use a light level difference between the work system and the protection system and light level values of the work system and the protection system when calculating a VOA control amount. For example, the switching-time calculation unit 15 may calculate a VOA control amount using a light level difference between the work system and the protection system as a parameter without using the light level values. For example, either a switching source or a switching destination, for example, either a light level difference and a light level of the switching source or a light level difference and a light level of the switching destination, may be additionally taken into consideration.

The transponder device 10 may switch between the normal feedback control P1 and the control P2 in the case where switching is performed. Two types of control may be performed substantially in parallel. In the optical transmission system 1, as a network topology, any network topology may be employed, such as a ring type, a bus type, a star type, a tree type, or a combination thereof. The number of optical transmission devices that relay an optical signal in a network may be one or more per system. The transmission distance from the transmission-side transponder device 20 to the reception-side transponder device 10 or the distance between devices for performing a relay operation (device interval) may be any value.

All or some of the components in the transponder device 10 may be functionally or physically separated or integrated in any unit in accordance with load, usage state, or the like. For example, the switching-time calculation unit 15 may be provided independently from the VOA calculation unit 19 and the function of the switching-time calculation unit 15 may be contained in the VOA calculation unit 19. The VOA calculation unit 19 may calculate a VOA control amount using techniques (P1, P2), the techniques used before switching being different from that used after switching. The switching unit 14 that provides an instruction of switching of a transmission path and the OSW 11 that performs switching may be integrated as one component. The integrated component may notify the switching-time calculation unit 15 of occurrence of switching. In the switching-time calculation unit 15, a part that calculates a light level difference between transmission paths and a part that calculates a control amount for a light level of a switching destination using the calculated result may be separated. Calculation may be performed at all times. A memory that stores the VOA control amount arithmetic table 153 may be coupled as an external device of the transponder device 10 via a network or a cable.

The switching-time calculation unit 15 in the transponder device 10 may calculate a VOA control amount for a light level of a switching destination in accordance with a light level difference between the work system and the protection system. The switching-time calculation unit 15 may use, for calculation of a VOA control amount, a ratio of a light level value of a switching destination to a light level value of a switching source, for example, a ratio indicating an increase or a ratio indicating a decrease. When light levels of both of the work system and the protection system are significantly high or low, a light level difference may fall within a certain range without reaching an excessively large or small value. Hence, the light level range to which control in the case where switching is performed is applied may become large. Adaptability of VOA control in the case where switching is performed may be improved.

A time at which calculation of a control amount for a light level of a switching destination based on a level of light output from the VOA 16 is restarted may be a time after a certain period of time has elapsed from switching of a transmission path. The foregoing time, for example, a time when normal feedback control is restarted after switching has been completed, may not be a time after a certain period of time has elapsed. For example, the foregoing time may be a point in time when a light level value which has increased or decreased because of switching of a transmission path returns to an appropriate value again. The foregoing time may be a point in time when a light level value which has increased or decreased starts to converge an appropriate value after having passed through the appropriate value and decreased or increased. Normal feedback control may be restarted after a level of light input to the network-side optical module 17 is optimized. A light level after switching of a transmission path becomes stable, thereby reducing the occurrence of bit errors.

In the transponder device 10, switching may be performed from the work system to the protection system or from the protection system to the work system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
   a switch configured to be capable of switching a transmission path for transmitting light from a first transmission path to a second transmission path;
   a first calculation unit configured to calculate, based on a difference between a first light level of the first transmission path and a second light level of the second transmission path, a first amount for controlling the second light level; and
   a control unit configured to perform, upon switching of the transmission path, a first control in which the second light level is decreased or increased based on the first amount by switching from performing a first feedback control in which the first light level is decreased or increased based on a second amount calculated based on the first light level.

2. The optical transmission device according to claim 1, wherein the first calculation unit calculates the first amount for controlling the second light level based on a difference between the first light level and the second light level, the first light level, and the second light level.

3. The optical transmission device according to claim 1, further comprising:
   a second calculation unit configured to calculate a third amount for controlling the second light level in a second feedback control after a certain period of time elapses from switching of the transmission path.

4. The optical transmission device according to claim 1, wherein switching performed by the switching unit and the first control performed by the control unit are performed substantially simultaneously.

5. The optical transmission device according to claim 1, wherein the switching unit monitors the first light level and switches from the first transmission path to the second transmission path when a failure is detected.

6. An optical transmission device comprising:
   a switching circuit configured to being capable of switching a transmission path to which light is input, from a first transmission path with a first light level to a second transmission path with a second light level,
   wherein the switching circuit switches from the first transmission path to the second transmission path based on an occurrence of an optical line failure in the first transmission path, and switches a first feedback control in which the first light level is decreased or increased based on an attenuated first light level obtained by attenuating the first light level of the first transmission path to a control in which the second light level is decreased or increased based on a difference between the first light level of the first transmission path and the second light level of the second transmission path.

7. The optical transmission device according to claim 6, further comprising:
a variable optical attenuator configured to attenuate the first light level of the first transmission path.

8. The optical transmission device according to claim 6, wherein, in the control, a control amount for the second light level is calculated based on a difference between the first light level and the second light level, the first light level, and the second light level.

9. An optical transmission method comprising:
switching a transmission path to which light is input from a first transmission path to a second transmission path;
calculating, by a processor, a first amount for controlling the second light level based on a difference between a first light level of the first transmission path and a second light level of the second transmission path; and
performing, upon switching of the transmission path, a control in which the second light level is decreased or increased based on the first amount upon switching of the transmission path by switching from performing a first feedback control in which the first light level is decreased or increased based on a second amount calculated based on the first light level.

10. The optical transmission device according to claim 1, wherein the first calculation unit and the control unit are included in a processor.

11. The optical transmission device according to claim 6, wherein the switching circuit switches the control to a second feedback control in which the second light level is controlled based on the second light level after a certain period of time elapses from switching of the transmission path.

12. The optical transmission method according to claim 9, further comprising:
calculating a third amount for controlling the second light level in a second feedback control after a certain period of time elapses from switching of the transmission path.

* * * * *